United States Patent [19]

Mohamed et al.

[11] Patent Number: 5,966,734
[45] Date of Patent: Oct. 12, 1999

[54] RESIZABLE AND RELOCATABLE MEMORY SCRATCH PAD AS A CACHE SLICE

[75] Inventors: Moataz A. Mohamed, Santa Clara; Heonchul Park, Cupertino, both of Calif.

[73] Assignee: Samsung Electronics Co., Ltd., Seoul, Rep. of Korea

[21] Appl. No.: 08/733,818

[22] Filed: Oct. 18, 1996

[51] Int. Cl.[6] .................................................. G06F 12/00
[52] U.S. Cl. ...................... 711/173; 711/128; 711/129; 711/169; 711/170; 711/171; 711/172
[58] Field of Search .................................. 711/129, 128, 711/170, 173, 171

[56] References Cited

U.S. PATENT DOCUMENTS

| | | | |
|---|---|---|---|
| 5,067,078 | 11/1991 | Talgam et al. | 711/3 |
| 5,517,626 | 5/1996 | Archer et al. | 395/290 |
| 5,619,676 | 4/1997 | Fukada et al. | 711/137 |
| 5,619,680 | 4/1997 | Berkovich et al. | 711/173 |
| 5,721,874 | 2/1998 | Carnevale et al. | 711/171 |
| 5,737,750 | 4/1998 | Kumar et al. | 711/129 |

OTHER PUBLICATIONS

Jim Handy, The Cache Memory Book, 1993.

*Primary Examiner*—Frank J. Asta
*Assistant Examiner*—William C. Vaughn, Jr.
*Attorney, Agent, or Firm*—Skjerven, Morrill, MacPherson, Franklin & Friel LLP; Alan H. MacPherson; David T. Millers

[57] ABSTRACT

A cache system supports a re-sizable software-managed fast scratch pad that is implemented as a cache-slice. A processor register indicates the size and base address of the scratch pad. Instructions which facilitate use of the scratch pad include a prefetch instruction which loads multiple lines of data from external memory into the scratch pad and a writeback instruction which writes multiple lines of data from the scratch pad to external memory. The prefetch and writeback instructions are non-blocking instructions to allow instructions following in the program order to be executed while a prefetch or writeback operation is pending.

11 Claims, 4 Drawing Sheets

RESIZABLE AND RELOCATABLE MEMORY SCRATCH PAD AS A CACHE SLICE

CROSS-REFERENCE TO RELATED APPLICATIONS

This patent document is related to and incorporates by reference U.S. pat. app. Ser. No. 08/697,102, entitled "MULTIPROCESSOR OPERATION IN A MULTIMEDIA SIGNAL PROCESSOR", filed Aug. 19, 1996, now abandoned; and U.S. pat. app. Ser. No. 08/699,597, entitled "SINGLE-INSTRUCTION-MULTIPLE-DATA PROCESSING IN A MULTIMEDIA SIGNAL PROCESSOR", filed Aug. 19, 1996, now abandoned.

BACKGROUND OF THE INVENTION

1. Field of the Invention

This invention relates to systems and methods which provide a processor with fast memory access and particularly to cache and scratch pad memory systems.

2. Description of Related Art

Processors often employ memories which are relatively slow when compared to the clock speeds of the processors. To speed up memory access for such processors, a relatively small amount of fast memory can be used in a data cache or scratch pad. A scratch pad typically occupies a portion of the address space of a processor, and programs executed by the processor access the scratch pad to take advantage of the faster memory access. A scratch pad has the disadvantage of only improving memory access time for the relatively small portion of the address space that corresponds to the scratch pad.

A cache can mediate memory accesses and improve the average memory access time for all or a large portion of the address space of a processor even though the cache is small relative to the address space. Caches do not occupy a specific portion of the address space of the processor but instead include tag information which identifies addresses for information in cache lines. Typically, a cache compares an address from a processor to tag information to determine whether the cache contains a valid entry for the memory address being accessed. If such an entry exists (i.e., if there is a cache hit), the processor accesses (reads from or writes to) the faster cache memory. In addition to tag information, a cache entry typically contains a "validity" bit and a "dirty" bit which respectively indicated whether the associated information in the entry is valid and whether the associated information contains changes to be written back to the slower memory. If there is no cache entry for the address being accessed (i.e., if there is a cache miss), access to the slower memory may be required for the cache to create a new entry for the just accessed memory address. Caches use schemes such as "least recently used" replacement to determine which old entries are replaced with new entries. Typically, programs access the same addresses repeatedly so that the most recently accessed data is likely to be accessed again soon and be available in the cache when required. Accordingly, caches can improve access time across the address space of the processor, but the overhead for hit/miss calculations, entry creation, and writebacks can make caches slower than scratch pads.

SUMMARY OF THE INVENTION

In accordance with an embodiment of the invention, a processor uses fast memory which can be partitioned for a cache and/or a scratch pad. When a scratch pad is enabled, the scratch pad occupies a user selectable portion of the address space of the processor and is accessed in place of slower memory having the same addresses. A user can select the sizes of the scratch pad and cache according to the requirements of a specific program, rather than accommodating a program to a fixed sized scratch pad.

In an exemplary embodiment, the processor includes on-chip memory configurable for use as a cache and/or scratch pad, and the processor implements specific instructions for scratch pad operations. Some of these scratch pad instructions transfer information between the scratch pad and an external memory. In accordance with one embodiment of the invention, the scratch pad instructions include first and second fields which respectively identify storage locations in the scratch pad and the external memory. In accordance with another embodiment of the invention, the scratch pad has a user configurable base address, and the scratch pad instructions include a single field which identifies storage locations in the scratch pad and storage locations in the external memory at the same addresses used for the scratch pad. Scratch pad instructions can transfer one or multiple lines of data between external memory and the scratch pad. The line size may be selected to match the cache lines used when on-chip memory is configured as a cache.

Scratch pad instructions can take many clock cycles to complete but are non-blocking so that instructions not having dependencies on a preceding scratch pad instruction can be executed out of the normal program order to more efficiently use the processor's resources. Programs can therefore use one or more scratch pad instructions to prefetch data into the scratch pad while instructions following or interwoven with the scratch pad instructions process data not affected by the scratch pad instructions. Once the program finishes processing one block of data, the processed data can be saved to external memory using scratch pad transfer instructions while processing of other data continues out of the normal program order.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
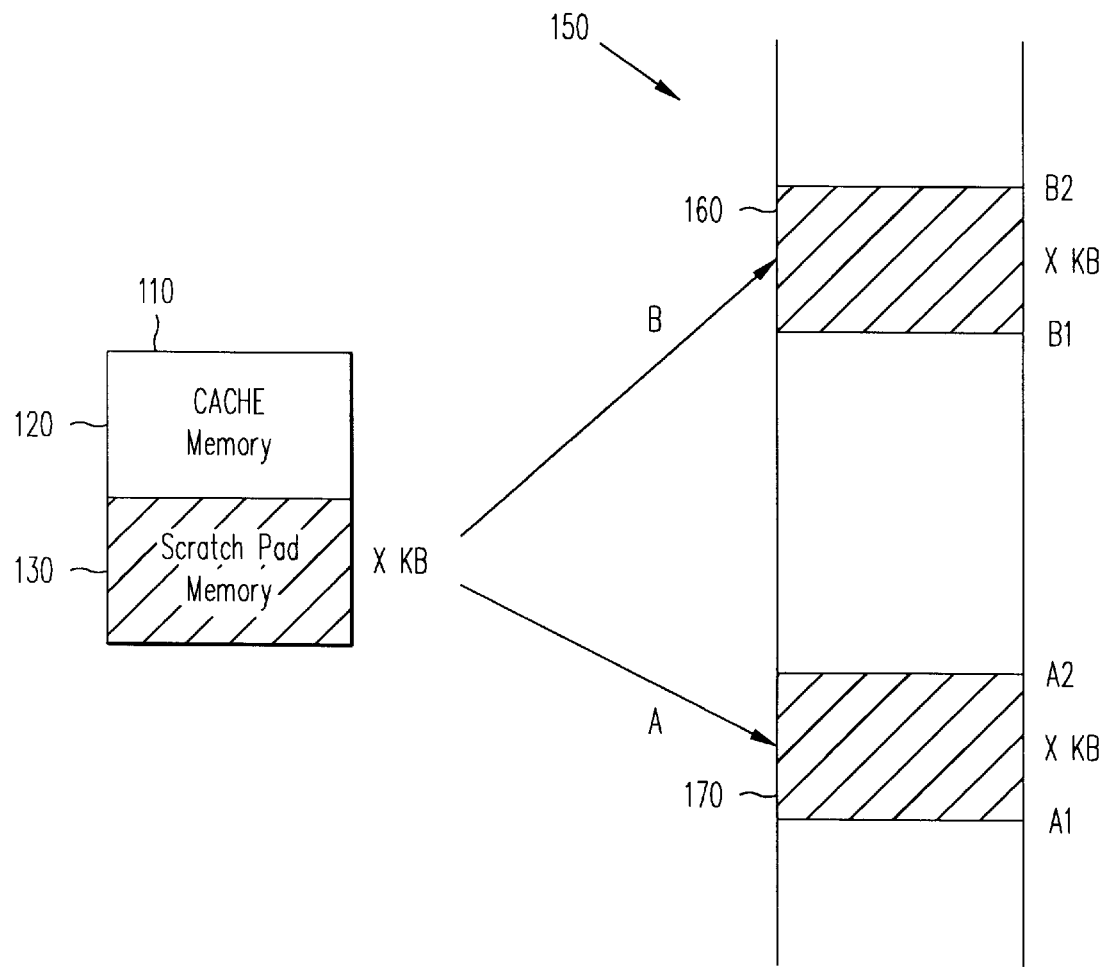
FIG. 1 illustrates a resizable scratch pad which can be relocated to different places in an address space.

In accordance with an embodiment of the invention shown in FIG. 1, a cache system includes fast memory 110 which can be partitioned for uses as a cache memory 120 and/or a scratch pad 130. For example, memory 110 may be configured entirely as cache memory 120, entirely as scratch pad memory 130, or partly as a cache and partly as a scratch pad. When there is a scratch pad, scratch pad 130 occupies a portion of an address space 150 of a processor and is accessed in place of external memory having the same addresses. Further, the addresses assigned to the scratch pad memory 130 can be selected according to a program's needs. Scratch pad memory 130 can occupy addresses 170 between values A1 and A2 and later be moved to address 160 between values B1 and B2. A user can select the sizes and location of scratch pad 130 and cache 120 according to the requirements of a specific program, rather than accommodating a program to a fixed sized scratch pad at a fixed location.

In accordance with another aspect of the invention, the cache system is internal to a processor which implements specific instructions for scratch pad operations. Some of these instructions transfer information between the scratch pad and external memory for the processor. Additional instructions prefetch or write-back cache lines of the data cache.

Figure 2:
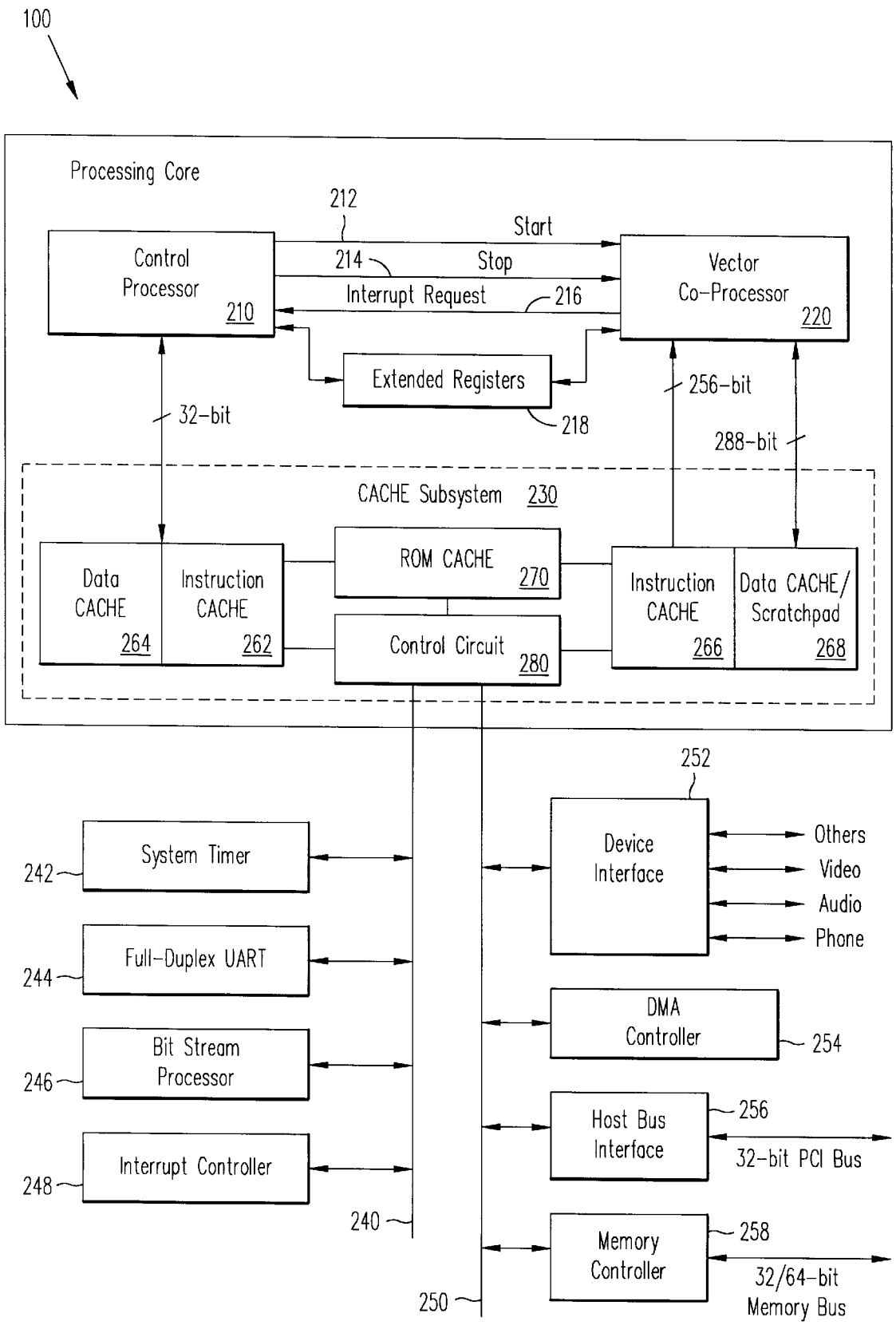
FIG. 2 is a block diagram of a processor in accordance with an embodiment of the invention.

FIG. 2 shows a block diagram of an exemplary embodiment of a multiprocessor 200 in accordance with an embodiment of the invention. Multiprocessor 200 is an integrated circuit which includes a general-purpose processor 210 and a vector processor 220. Processors 210 and 220 communicate with each other through direct lines 212, 214, and 216 or through extended registers 218 which processors 210 and 220 share. Processors 210 and 220 connect to the other on-chip components through a cache subsystem 230 which contains an instruction cache 262 and a data cache 264 for processor 210 and an instruction cache 266 and data cache/scratch pad 268 for vector processor 220. Cache subsystem 230 also includes a ROM cache 270 and control circuitry 280.

Cache subsystem 230 connects processors 210 and 220 to two system busses 240 and 250 and operates as a switching station for processor 210, processor 220, and the devices coupled to busses 240 and 250. Above-incorporated U.S. patent app. Ser. No. 08/697,102, now abandoned further describes operation of a cache subsystem as a switching station. System bus 250, sometimes referred to herein as FBUS 250, operates at a higher clock frequency than bus 240 and is connected to faster devices such as a device interface 252, a DMA (direct memory access) controller 254, a host interface 256, and a memory controller 258. Memory controller 258, host interface 256, and device interface 252 provide interfaces for an external memory, a host computer, and various analog-to-digital and digital-to-analog converters. DMA controller 254 controls DMA operations between the external memory and codecs connected to device interface 252. System bus 240 which is sometimes referred to herein as IOBUS 240 connects to slower devices such as a system timer 242, a UART (universal asynchronous receiver transceiver) 244, a bitstream processor 246, and an interrupt controller 248.

Processors 210 and 220 execute separate program threads and are structurally different for more efficient execution of particular tasks. In an exemplary embodiment of the invention, processor 210 implements the ARM7 architecture and instruction set described in the "ARM7DM Data Sheet", Document Number: ARM DDI 0010G which is available from Advance RISC Machines Ltd.; and vector processor 220 implements the instruction set described in U.S. patent app. Ser. No. 08/699,597, now abandoned. Processor 210 executes a real-time operating system, exception routines for both processors 210 and 220, and general processes not requiring large numbers of repetitive calculations. Processor 210 also controls initialization, starting, and stopping of vector processor 220. Vector processor 220 performs number crunching including repetitive operations on large data blocks that are common in multimedia processing. In accordance with an aspect of the invention, a program executed by vector processor 280 can configure cache/scratch pad 268 to include a scratch pad and then load into the scratch pad all or part of a data block to be processed. Vector processor 220 can access data in the scratch pad quickly because data cache/scratch pad 268 contains a fast memory and the scratch pad is not slowed by the overhead for cache operations.

Figure 3:
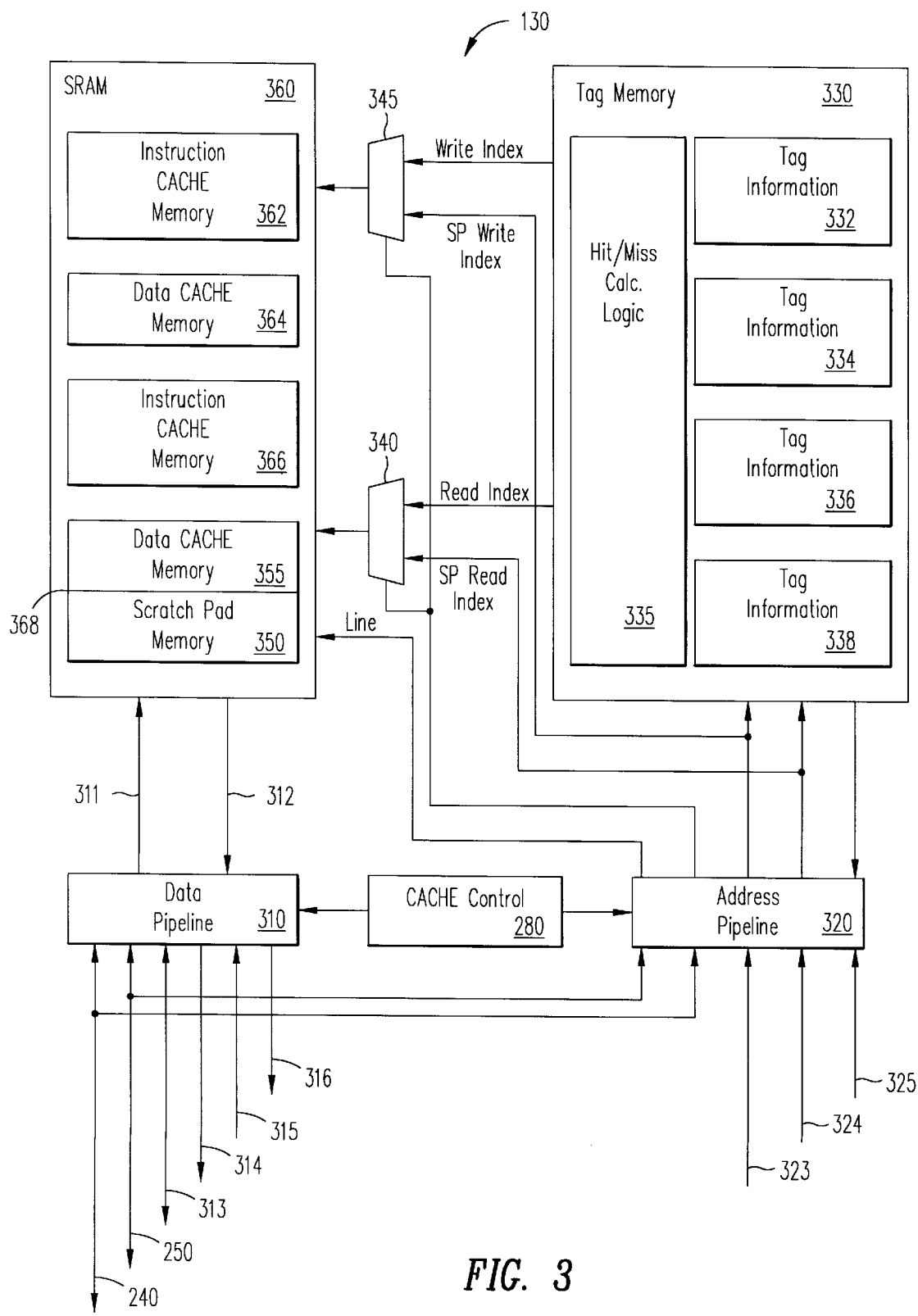
FIG. 3 is a block diagram of a portion of a cache subsystem for the processor of FIG. 1.

FIG. 3 shows a block diagram of an embodiment of cache subsystem 230. In this embodiment, cache subsystem 220 is a direct mapped cache that includes control circuit 280, a data pipeline 310, an address pipeline 320, a tag memory 330, and an SRAM 360. SRAM 360 is divided into four memory section 362, 364, 366, and 368 associated with instruction cache 262 and data cache 264 for processor 210 and instruction cache 266 and data cache/scratch pad 268 for vector processor 220. In an exemplary embodiment of the invention, SRAM 360 is organized to provide 64-byte cache lines, and each of memory sections 362, 364, and 366 contain 16 cache lines or 1 KB (kilobyte) of information storage. Memory section 368 is 4 KB in size for up to 64 64-byte cache lines or up to 4 KB of scratch pad memory. SRAM 360 is dual-ported with a read port 312 and a write port 311 that permit simultaneous reading and writing of SRAM 360. In the exemplary embodiment, each of read port 312 and write port 311 are 256-bit (32-byte) data ports.

For uses of SRAM 360 as caches, a tag memory 330 which contains tag information bits for caches 262, 264, 266, and 268 is partitioned into sections 332, 334, 336, and 338 for memory sections 362, 364, 366, and 368, respectively. The tag information for each cache line includes a tag, two validity bits, two dirty bits, and use information. Each validity bit and dirty bit corresponds to a 32-byte half of a cache line which is equal to the amount of data transferred by a single read or write operation. Each dirty bit indicates a single 256-bit write to external memory, and each validity bit indicates a single 256-bit read from external memory. The used bits are for the entry replacement scheme used to create new entries.

Address pipeline 320 is coupled to IOBUS 240, FBUS 250, processor 210 via an address bus 323, and vector processor 220 via a data address bus 324 and an instruction address bus 325. Address pipeline 320 provides addresses to tag memory 330 for hit/miss calculations. Two addresses, a read address and a write address, can be applied to tag memory 330 simultaneously. For each address from address pipeline 320, hit/miss calculation logic 335 extracts an index (a read index or a write index) from the address (read address or write address) to identify a tag value in a section 332, 334, 336, or 338. The section of tag memory 330 used depends on the source of the address. Hit/miss calculation logic 335 compares the identified tag value to the most significant bits of the address determine whether the associated data cache 262, 264, 266, or 268 includes an entry corresponding to the address.

If there is a hit for the read address, tag memory 330 applies the read index to the input terminals of a multiplexer 340. The read index identifies data in SRAM 360 in a cache line associated with the read address. Multiplexer 340, under control of address pipeline 320, applies the read index to SRAM 360, and data from the associated cache line is available via read port 312 and data pipeline 310. Address pipeline 320 provides a signal LINE is derived from the six least significant bits of the address signals an offset which identifies the requested data from within the cache line. If there is a cache miss for the read address, access to external memory is required. A new entry is created in the section 332, 334, 336, or 338 of tag memory 330 that corresponds to the source (processor 210 or 220) and the type (data or instruction) of the read address signal. No entries are created for addresses from IOBUS 240 or FBUS 250.

If there is a hit for the write address, tag memory 330 routes the write index through a multiplexer 345 to SRAM 360. Data from data pipeline 310 can then be written to SRAM 360 via write port 311, and validity bits are set to indicate that the associated cache line is dirty. If there is a cache miss for the write address from processor 210 or 220, a new entry is created before data is written to SRAM 360. The entry created is in the section 334 or 338 of tag memory 330 that corresponds to the source (processor 210 or 220) of the address signal.

In accordance with an aspect of the invention, none, part, or all of memory section 368 can be configured as a scratch pad 350. In an exemplary embodiment of the invention, extended registers 218 include a register SPREG for configuration of scratch pad 350. In register SPREG, a 2-bit field SPSIZE indicates a size of either 0, 1, 2, or 4 KB for scratch pad 350, and a field SPBASE indicates a base address for scratch pad 350. (Specifically field SPBASE indicates an offset from a base address for processor 200.) Address pipeline 320 compares input read and write addresses to the base address for scratch pad 350 to determine whether the input address corresponds to data in scratch pad 350. If the address corresponds to scratch pad 350, no hit/miss calculation is required, and address pipeline 320 extracts from the input address a scratch pad (SP) read index or a scratch pad (SP) write index. Multiplexer 340 or 345 routes the SP read index or SP write index to SRAM 360. To implement the variable cache and scratch pad sizes, memory section 268 contains four 1-KB subsections which have associated subsections in tag information 338. Field SPSIZE indicates whether 0, 1, 2, or all 4 of the subsection in memory section 268 are reserved for scratch pad 350. The number of address bits used for the index and tag values adjust according to the size of the cache memory. Sections of hit/miss calculation logic 335 are disabled for all (if any) subsections of memory section 268 assigned to scratch pad 350, and creation of tag entries are limited to the subsections of tag information 338 (if any) that are associated vector data cache 355. Accordingly, fast access is provided to on-chip memory without the overhead for cache operations.

Vector processor 220 implements specific instructions which facilitate efficient use of scratch pad 350. The Appendix includes a description of prefetch and writeback instructions which are used in the exemplary embodiment of the invention. Prefetch instructions copy data from external memory into scratch pad 350. The data in scratch pad 350 can be accessed much more quickly than data in external memory and even more quickly than data in vector data cache 355 because slower accesses to external memory are not required. Accordingly, data in scratch pad 350 can be processed more quickly than if the data were kept in external memory and access through a cache. Writeback instructions write data from scratch pad 350 back to external memory and may be used when vector processor 220 finishes processing a block of data.

In accordance with another aspect of the invention, each prefetch or writeback instruction can move multiple lines of data. Accordingly, moving a large block of data requires execution of relatively few prefetch or writeback instructions, but each instruction can take many clock cycles to complete. For example, in the exemplary embodiment of the invention, an instruction VPFTCHSP.x moves x lines of data where x is 1, 2, 4, or 8 and each line includes 64 bytes. Write port 311 is a 32-byte (256-bit) port so that at least two writes to SRAM 360 are required per line moved. Accordingly, at least 16 writes are required to complete one instruction VPFTCHSP.8, and each write can require multiple clock cycles to access the necessary data from external memory.

Prefetch and writeback instruction can be implemented using two alternative instruction format. A first instruction format uses two effective addresses one indicating an address in scratch pad 350 and another in external memory. The effective address for scratch pad 350 can be indicated by an index which is an offset from the base address of scratch pad 350. The second effective address corresponds to external memory and uses any of the addressing scheme available within an instruction syntax.

A second instruction format uses a single effective address which identifies two storage locations, one in scratch pad 350 and one in external memory. Field SPBASE of register SPREG indicates the base address of scratch pad 350 and can be set to correspond to an address in external memory so that addresses in scratch pad 350 are in one-to-one correspondence with addresses in external memory. When this occurs normal read and write operations access scratch pad 350 instead of slower external memory so that scratch pad 350 effectively replaces a section of external memory. Prefetch and writeback instructions using the second instruction format move data between storage locations in scratch pad 350 and the corresponding replaced storage locations in external memory.

In accordance with another aspect of the invention, prefetch and writeback instruction are non-blocking to avoid or reduce hold ups while vector processor 220 completes such instructions. In particular, instructions coming after a prefetch or writeback instruction in program order can be issued, executed, and completed out-of-order if there are no dependencies.

Figure 4:
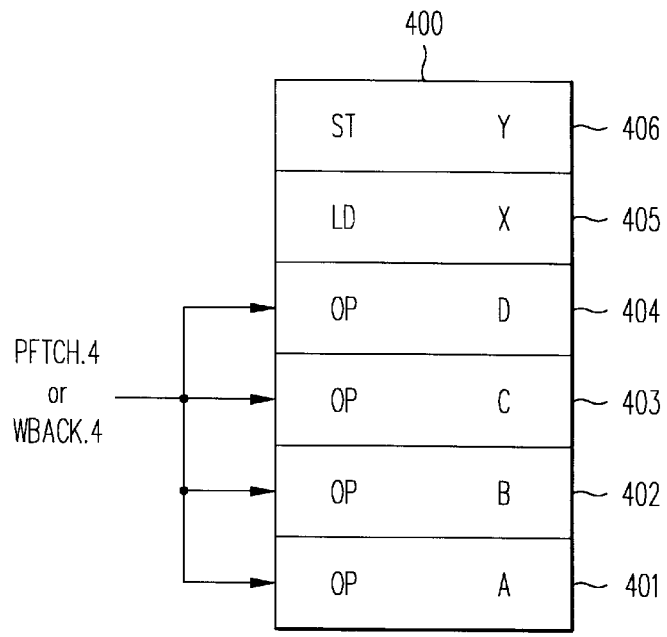
FIG. 4 illustrates a load/store execution quene during execution of a prefetch or write-back operation in accordance with an embodiment of the invention.

FIG. 4 shows a block diagram of an execution queue 400 for a load/store unit which execute load and store instructions in vector processor 220. Queue 400 includes multiple entries 401 to 406. When vector processor 220 decodes a multiple-line prefetch or writeback, multiple separate entries are created in queue 400. In FIG. 4, a four cache line prefetch or writeback operation creates four operations OP_A, OP_B, OP_C, and OP_D which are shown in queues entries 401 to 404. Each of OP_A, OP_B, OP_C, and OP_D transfers one line of data. These operations are dependent on each other because all increment and use the same index for accessing scratch pad 350. Other operations which follow the prefetch or writeback operation can be loaded into queue 400. For example, a load operation and a store operation are loaded into entries 405 and 406 respectively. Comparisons of the field values for the operations in quene 400 indicate whether any operand dependencies or resource conflicts exist, but if there are no conflicts or dependencies, instructions can be executed out of the normal program order. OP_A, OP_B, OP_C, and OP_D are non-blocking which permits selection and completion of the load operation in entry 405 and/or the store operation in entry 406 before any or all of OP_A, OP_B, OP_C, and OP_D are completed if there are no dependencies.

Figure 5:
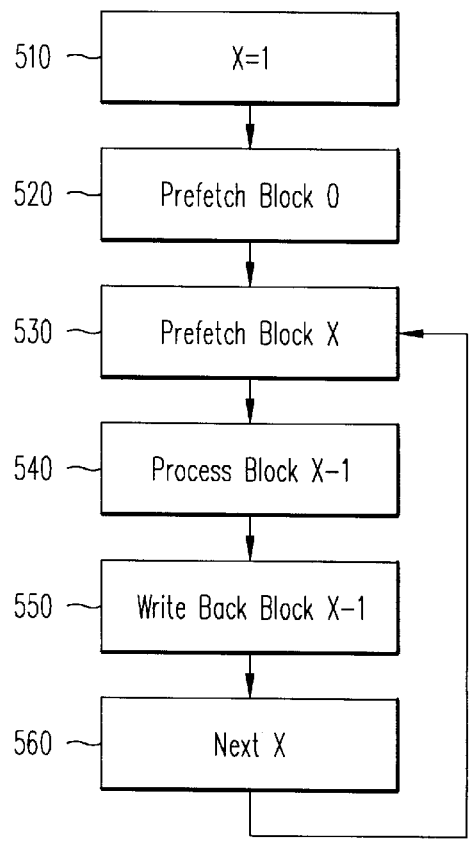
FIG. 5 illustrates a program architecture in accordance with an embodiment of the invention.

FIG. 5 illustrates an architecture for a program which processes blocks of data for an application such as video encoding or decoding. In the program architecture of FIG. 5, instructions 520 prefetch an initial block of data into a first portion of scratch pad 350. Instructions 530 which prefetch the next block of data into a second portion of scratch pad 350 follow instructions 520 but precedes instructions 540 which process the initial block of data. During execution of the program, instructions 540 can be completed concurrently with instructions 530 since prefetch instructions are non-blocking and since instructions 540 access a portion of scratch pad 350 not affected by instructions 530. Alternatively, instead of instructions 540 following instructions 530, instructions 530 and 540 can be interwoven with efficient utilization of processing resources because during the clock cycles while each prefetch instruction is pending other instructions can be issued and executed out-of-order. Following the processing of a block of data in scratch pad 350, instructions 550 write the block back to external memory.

In accordance with another aspect of the invention, the instruction set for vector processor 220 includes prefetch and writeback instructions for data cache 355. The Appendix includes a description of an exemplary cache prefetch instruction VPFTCH and cache writeback instruction VWBACK. These cache prefetch and writeback instructions are similar to the scratch pad instructions in that a single instruction can move multiple lines (cache lines) of data between SRAM 360 and external memory. The cache prefetch instruction differs from the scratch pad instruction in that a tag is saved in tag memory 330 for each line saved in data cache 355. The cache writeback instruction writes to external memory all or portions of cache lines which are dirty and correspond to consecutive cache lines. The associated dirty bits are cleared. The cache prefetch and writeback instructions provide additional program control over cache operations and in particular, allow a program to prefetch data into data cache 355 before the data is to be processed. According, when processing of the data begins, program execution is not slowed by accesses to slower external memory.

The scratch pad prefetch and writeback instructions and the cache prefetch and writeback instruction can be employed by "smart" compilers to create faster executing code. For example, a compiler can recognize that a set of instructions accesses a particular portion of the address space of a processor and create a scratch pad assigned to that portion of the address space. Data for the scratch pad is prefetched for execution and later written back in a manner which may be completely transparent to the programmer. The scratch pad can later be assigned to another portion of the address space as required by a program. The cache prefetch and writeback instructions can be used in the same manner to preload a cache with data repeatedly used.

Although the invention has been described with reference to particular embodiments, the description is only an example of the invention's application and should not be taken as a limitation. Various other adaptations and combinations of features of the embodiments disclosed are within the scope of the invention as defined by the following claims.

APPENDIX

This Appendix describes the syntax for instructions that an exemplary embodiment of multiprocessor 200 of FIG. 2 executes to control prefetch and writeback operations from a cache or scratch pad. The instructions are part of an instruction set for the exemplary embodiment of vector processor 220. U.S. pat. app. No. 08/699,597, which is incorporated by reference above, contains a description of the complete instruction set.

Each instruction described below accesses multiple memory locations and requires an effective address EA<31:0> for external memory. The format of an instruction depends on the addressing mode of the instruction. One format is for an operation where effective address EA<31:0> is the sum of an address from a first register and an index from a second register. The other format is for an operation where effective address EA<31:0> is the sum of an address from a register and an immediate value form the instruction. If necessary, the effective address is truncated for alignment to a 64-byte boundary. An exception occurs if the effective address is invalid.

For each the following instruction, a field LN indicates the number of 64-byte cache lines or 64-byte data blocks transferred. If LN=00, one 64-byte cache line or data block is transferred. If LN=01, two 64-byte cache lines or data blocks are transferred. If LN=10, four 64-byte cache lines or data blocks are transferred; and if LN=11, eight 64-byte cache lines or data blocks are transferred. Accordingly, a single instruction can transfer up to 512 bytes of data.

VPFTCH Prefetch

Instruction VPFTCH prefetchs multiple cache lines starting from effective address EA<31:0> in external memory into the data cache of vector processor 220. VPFTCH has two formats illustrated in Tables A.1 and A.2.

TABLE A.1

VPFTCH Format

| Field | Bits | Description |
| --- | --- | --- |
|  | <32:24> | 00000110 |
|  | <23:22> | Unused |
| LN | <21:20> | Number of Cache Lines |
|  | <19> | 0 |
| A | <18> |  |
|  | <17:10> |  |
| SRb | <9:5> | Address Register |
| SRi | <4:0> | Address Index register |

TABLE A.2

VPFTCH Format with Immediate Value

| Field | Bits | Description |
| --- | --- | --- |
|  | <32:24> | 00100110 |
|  | <23:22> | Unused |
| LN | <21:20> | Number of Cache Lines |
|  | <19> | 0 |
| A | <18> |  |
| IMM<7:5> | <17:15> | Immediate Value Offset |
|  | <14:10> | Unused |
| SRb | <9:5> | Address Register |
| IMM<4:0> | <4:0> | Immediate Value Offset |

Assembler Syntax:
VPFTCH.ln    SRb, SRi
VPFTCH.ln    SRb, #IMM
VPFTCH.ln    SRb+, SRi
VPFTCH.ln    SRb+, #IMM
where ln = {1, 2, 4, 8}.

VPFTCHSP Prefetch To Scratch Pad

Instruction VPFTCHSP prefetchs into the scratch pad 350 of vector processor 220 multiple 64-byte blocks of data starting from effective address EA<31:0> in external memory. VPFTCHSP has two formats illustrated in Tables A.3 and A.4.

TABLE A.3

VPFTCHSP Format

| Field | Bits | Description |
|---|---|---|
|  | <32:24> | 00000110 |
|  | <23:22> | Unused |
| LN | <21:20> | Number of Cache Lines |
|  | <19> | 1 |
| A | <18> |  |
|  | <17:15> | Unused |
| SRp | <14:10> | Scratch Pad Index |
| SRb | <9:5> | Address Register |
| SRi | <4:0> | Address Index register |

TABLE A.4

VPFTCHSP Format with Immediate Value

| Field | Bits | Description |
|---|---|---|
|  | <32:24> | 00100110 |
|  | <23:22> | Unused |
| LN | <21:20> | Number of Cache Lines |
|  | <19> | 1 |
| A | <18> |  |
| IMM<7:5> | <17:15> | Immediate Value Offset |
| SRp | <14:10> | Scratch Pad Index |
| SRb | <9:5> | Address Register |
| IMM<4:0> | <4:0> | Immediate Value Offset |

The effective address EA<31:0> provides the starting address in external memory and register SRp provides the starting address in the scratch pad. If effective address EA<31:0> is not on a 64-byte boundary, it is first truncated to be aligned to the 64-byte boundary.

If the scratch pad pointer address in SRp is not on a 64-byte boundary, it is also truncated to be aligned to the 64-byte boundary. The aligned scratch pad pointer address is incremented by the number of bytes transferred. Invalid data address exception occurs if either address is invalid.

Assembler Syntax

VPFTCHSP.ln SRp, SRb, SRi
VPFTCHSP.ln SRp, SRb, #IMM
VPFTCHSP.ln SRp, SRb+, SRi
VPFTCHSP.ln SRp, SRb+, #IMM
 where ln={1, 2, 4, 8}.

Operation

EA=SRb+{SRi∥sex(IMM<7:0>)};
if (A==1) SRb=EA;
Num_bytes={64∥128∥256∥512};
Mem_adrs=EA<31:6>: 6b'000000;
SRp=SRp<31:6>: 6b'000000;
for (i=0; i<Num_bytes; i++)SPAD[SRp++]=MEM
  [Mem_adrs+i];

VWBACK Writeback

Instruction VWBACK writes multiple cache lines starting from the cache line having an index specified by the effective address EA (as opposed to a tag matching the effective address EA) to external memory if the cache line contains modified data. If more than one cache line is specified, the sequential cache lines are updated to memory if they contain modified data. VWBACK has two formats illustrated in Tables A.5 and A.6.

TABLE A.5

VWBACK Format

| Field | Bits | Description |
|---|---|---|
|  | <32:24> | 00010110 |
|  | <23:22> | Unused |
| LN | <21:20> | Number of Cache Lines |
|  | <19> | 0 |
| A | <18> |  |
|  | <17:10> |  |
| SRb | <9:5> | Address Register |
| SRi | <4:0> | Address Index register |

TABLE A.6

VWBACK Format with an Immediate Value

| Field | Bits | Description |
|---|---|---|
|  | <32:24> | 00110110 |
|  | <23:22> | Unused |
| LN | <21:20> | Number of Cache Lines |
|  | <19> | 0 |
| A | <18> |  |
| IMM<7:5> | <17:15> | Immediate Value Offset |
|  | <14:10> | Unused |
| SRb | <9:5> | Address Register |
| IMM<4:0> | <4:0> | Immediate Value Offset |

Assembler Syntax:
VWBACK.ln    SRb, Si
VWBACK.ln    SRb, #IMM
VWBACK.ln    SRb+, SRi
VWBACK.ln    SRb+, #IMM
where ln = { 1, 2, 4, 8 }.

VWBACKSP Writeback From Scratch Pad

Transfers multiple 64-byte blocks from the scratch pad to memory. The effective address EA is the starting address in external memory and register SRp provides a scratch pad pointer address SPAD for the scratch pad. If necessary, the scratch pad pointer address SPAD from register SRp is truncated to be aligned to a 64-byte boundary. The aligned scratch pad pointer address SPAD is incremented by the number of bytes transferred. Tables A.7 and A.8 illustrate the two formats for the VWBACKSP instruction.

TABLE A.7

VWBACKSP Format

| Field | Bits | Description |
|---|---|---|
|  | <32:24> | 00010110 |
|  | <23:22> | Unused |
| LN | <21:20> | Number of Cache Lines |
|  | <19> | 1 |
| A | <18> |  |
|  | <17:15> | Unused |
| SRp | <14:10> | Scratch Pad Index |
| SRb | <9:5> | Address Register |
| SRi | <4:0> | Address Index register |

TABLE A.8

VWBACKSP Format with an Immediate Value

| Field | Bits | Description |
|---|---|---|
|  | <32:24> | 00110110 |
|  | <23:22> | Unused |

TABLE A.8-continued

VWBACKSP Format with an Immediate Value

| Field | Bits | Description |
|---|---|---|
| LN | <21:20> | Number of Cache Lines |
|  | <19> | 1 |
| A | <18> |  |
| IMM<7:5> | <17:15> | Immediate Value Offset |
| SRp | <14:10> | Scratch Pad Index |
| SRb | <9:5> | Address Register |
| IMM<4:0> | <4:0> | Immediate Value Offset |

Note that VWBACK and VWBACKSP use the same opcode.
Assembler Syntax:

| | |
|---|---|
| VWBACKSP.ln | SRp, SRb, SRi |
| VWBACKSP.ln | SRp, SRb, #IMM |
| VWBACKSP.ln | SRp, SRb+, SRi |
| VWBACKSP.ln | SRp, SRb+, #IMM | where ln={1, 2, 4, 8}.
Operation:
EA=SRb+{SRi||sex(IMM<7:0>)};
if (A==1) SRb=EA;
Num_bytes={64||128||256||512};
Mem_adrs=EA<31:6>: 6b'000000;
SRp=SRp<31:6>: 6b'000000;
for (i=0; i<Num_bytes: i++) SPAD[SRp++]=MEM[Mem_adrs+i];

We claim:

1. A cache comprising:
a memory and
control circuitry which controls access to the memory, wherein the control circuitry is configurable so that a first portion of the memory is accessible as a cache memory at the same time that a second portion of the memory section is accessible as a scratch pad, and wherein the control circuitry comprises:
a tag memory; and
an address pipeline which receives input address signals; generates from an address signal corresponding to the second portion of the memory an index identifying a storage location in the second portion of the memory; and routes an address signal not corresponding to the second portion of the memory to the tag memory for a hit/miss calculation.

2. The cache system of claim 1, wherein the tag memory is partitioned into a first section associated with the first portion of the memory and a second section associated with the second portion of the memory, wherein hit/miss calculations are disabled for the second section of the tag memory.

3. The cache system of claim 2, wherein cache entry creation is disabled for the second section of the tag memory.

4. The cache system of claim 1, wherein the first portion of the memory has a first size, the second portion of the memory has a second size, and the control circuitry is configurable to vary the first size and the second size.

5. The cache system of claim 4, wherein the first portion and the second portion partition the memory so that the second portion of the memory includes all of the memory that is not included in the first portion.

6. A cache system comprising:
a memory that includes a plurality of memory sections, wherein each memory section includes multiple lines and each memory section is individually configurable for use in a cache memory or in a scratch pad memory;
a tag memory that includes a plurality of tag sections, wherein each tag section corresponds to one of the memory sections and includes multiple entries, each entry corresponding to one of the lines in the memory section that corresponds to the tag section containing the entry;
hit/miss logic coupled to the tag memory, wherein the hit/miss logic compares at least a portion of an input address to information in the entries to match an entry with the input address, the hit/miss logic generating an index to identify the line that corresponds to the entry matched to the input address; and
an address pipeline adapted to receive the input address and to generate an internal address for accessing the memory, wherein:
in response to the input address being within a range of addresses corresponding to the scratch pad memory, the address pipeline generates the internal address from the input address to access one of the memory sections that is configured for use in the scratch pad memory; and
in response to the input address being outside the range of addresses corresponding to the scratch pad memory, the address pipeline uses the index from the hit/miss logic in generating the internal address to access one of the memory sections that is configured for use in the cache memory.

7. The cache system of claim 6, further comprising a first register that is programmable to select a size of the scratch pad memory.

8. The cache system of claim 7, further comprising a second register that is programmable to select a base address for the range of addresses corresponding to the scratch pad memory.

9. The cache system of claim 6, further comprising a register that is programmable to select a base address for the range of addresses corresponding to the scratch pad memory.

10. The cache system of claim 6, wherein the hit/miss logic comprises a plurality of logic sections, each of which corresponds to one of the memory sections and one of the tag sections, where each logic section is disabled if its corresponding memory section is configured for use in the scratch pad memory.

11. The cache system of claim 10, wherein each logic section when enabled, assigns an address to an entry in the corresponding tag section in response to a cache miss, and each logic section when disable, does not assign addresses to entries.

* * * * *